(12) United States Patent
Ito et al.

(10) Patent No.: US 6,513,611 B2
(45) Date of Patent: *Feb. 4, 2003

(54) VEHICLE SPEED CONTROL SYSTEM

(75) Inventors: Akira Ito, Wako (JP); Hideaki Kotani, Wako (JP); Hiroshi Sato, Wako (JP); Naoto Sen, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/988,262

(22) Filed: Nov. 19, 2001

(65) Prior Publication Data

US 2002/0029913 A1 Mar. 14, 2002

Related U.S. Application Data

(62) Division of application No. 09/570,414, filed on May 12, 2000.

(30) Foreign Application Priority Data

May 14, 1999 (JP) ............................................ 11-133778

(51) Int. Cl.[7] .............................................. B60K 31/04
(52) U.S. Cl. ........................................ 180/179; 701/95
(58) Field of Search ................................ 180/170, 176, 180/177, 178, 179; 364/424.01, 426.04; 74/866, 867; 701/53, 54, 96, 64, 95, 93

(56) References Cited

U.S. PATENT DOCUMENTS

| | | | | |
|---|---|---|---|---|
| 4,507,986 A | * | 4/1985 | Okamura et al. ............. | 477/43 |
| 4,771,656 A | | 9/1988 | Itoh et al. ..................... | 74/866 |
| 4,793,217 A | | 12/1988 | Morisawa et al. ............ | 74/866 |
| 4,905,544 A | | 3/1990 | Ganoung ...................... | 74/858 |
| 4,933,859 A | * | 6/1990 | Tsuyama et al. .............. | 701/93 |
| 4,960,182 A | | 10/1990 | Mimura et al. ............. | 180/179 |
| 4,964,318 A | | 10/1990 | Ganoung ...................... | 74/859 |
| 4,967,357 A | * | 10/1990 | Mimura et al. ............... | 701/97 |
| 5,056,637 A | * | 10/1991 | Miyawaki et al. ............ | 477/39 |
| 5,079,705 A | | 1/1992 | Sakai et al. ............... | 364/424.1 |
| 5,317,937 A | * | 6/1994 | Yoshizawa et al. ......... | 477/120 |
| 5,364,321 A | | 11/1994 | Togai et al. .................. | 477/42 |
| 5,382,205 A | | 1/1995 | Togai et al. .................. | 477/43 |
| 5,507,705 A | | 4/1996 | Hara .......................... | 477/108 |

(List continued on next page.)

FOREIGN PATENT DOCUMENTS

| | | |
|---|---|---|
| JP | 5-071625 | 3/1993 |
| JP | 9-207616 | 8/1997 |
| JP | 10-29448 | 2/1998 |

Primary Examiner—Brian L. Johnson
Assistant Examiner—Bridget Avery
(74) Attorney, Agent, or Firm—Arent Fox Kintner Plotkin & Kahn

(57) ABSTRACT

A system for controlling a speed of a vehicle having a continuously variable transmission (CVT) and a cruise controller which controls the traveling speed of the vehicle to a desired speed in response to an instruction to cruise control inputted by a vehicle operator. In the system, the speed ratio is fixed to a value, at which the instruction to cruise control is inputted, for a predetermined period of time since inputting of the instruction to cruise control. The speed ratio may be fixed to the value until the throttle opening has stabilized or the vehicle speed is equal to the desired vehicle speed even after the predetermined period of time has elapsed. Alternatively, a parameter indicative of upslope of the road where the vehicle climbs is determined and the speed ratio may be controlled-based on the parameter and the vehicle speed, or thereafter until the throttle opening has stabilized or the vehicle speed is equal to the desired vehicle speed. With this, the system can reduce throttle opening change and can decrease variation in vehicle speed when the cruise control is effected.

12 Claims, 14 Drawing Sheets

U.S. PATENT DOCUMENTS

| | | | | |
|---|---|---|---|---|
| 5,611,748 A | * | 3/1997 | Kashiwabara | 477/47 |
| 5,623,408 A | | 4/1997 | Motamedi et al. | 364/424 |
| 5,665,026 A | | 9/1997 | Linden | 477/108 |
| 5,754,428 A | * | 5/1998 | Ishikawa | 701/55 |
| 5,901,806 A | | 5/1999 | Takahashi | 180/170 |
| 5,961,566 A | | 10/1999 | Heslop | 701/93 |
| 5,995,895 A | * | 11/1999 | Watt et al. | 701/50 |
| 6,017,290 A | | 1/2000 | Kinoshita et al. | 477/108 |
| 6,066,070 A | * | 5/2000 | Ito et al. | 477/43 |
| 6,076,622 A | | 6/2000 | Chakraborty et al. | 180/169 |
| 6,078,859 A | | 6/2000 | Jastrzebski et al. | 701/93 |
| 6,182,000 B1 | | 1/2001 | Ohta et al. | 701/55 |
| 6,220,987 B1 | | 4/2001 | Robichaux et al. | 477/97 |
| 6,311,118 B1 | * | 10/2001 | Ito et al. | 701/95 |

* cited by examiner

VEHICLE SPEED CONTROL SYSTEM

This is a Division of Application Ser. No. 09/570,414 filed May 12, 2000. The disclosure of the prior application is hereby incorporated by reference herein in its entirety.

BACKGROUND OF THE INVENTION

1. Field of the Invention

This invention relates to a vehicle speed control system, more particularly to a vehicle speed control system equipped with a cruise controller and a CVT (Continuously Variable Transmission).

2. Description of the Related Art

Japanese Laid-open Patent Application No. Hei 10 (1998)-29448 teaches a cruise controller for a vehicle equipped with a CVT. This cruise controller has a followup operation to follow up another vehicle running ahead of the subject vehicle. In this prior art system, when the followup operation is in progress, the ratio (speed ratio) of the CVT is controlled at a fixed ratio and it is determined whether required torque is available. If the required torque is not available, the air/fuel ratio to be supplied to the engine is enriched, thereby reducing the engine speed fluctuation and preventing wandering of the engine speed from happening.

Generally speaking, in the cruise controller including that mentioned above, when the vehicle operator manipulates the set switch to input the intention to cruise, the controller effects an initial operation (initialization) for operating a throttle actuator (for moving the throttle valve) from its initial position (corresponding to the fully-closed throttle position or thereabout) to a position corresponding to the throttle valve opening or a position at which the vehicle operator inputted the instruction to cruise control. Depending on when the vehicle operator releases the accelerator pedal, the throttle actuator may not reach the required position or in the worst case, the throttle valve may remain at the fully closed position.

This will be explained with reference to FIG. 14. Assume, for example, that during uphill driving the vehicle operator expresses a desire to cruise control by turning the set switch on at time point t1. The initial operation begins from this time point.

Normally, the vehicle operator would release the accelerator pedal simultaneously with turning on the set switch at time point t1. However, it may sometimes happen that the vehicle operator continues to press down on the accelerator pedal even after time point t1. In such a case, the vehicle speed will exceed the desired speed instructed through the set switch and the cruise controller misinterpreting this to mean that the throttle actuator was moved too far in the opening direction, will move the throttle actuator in the closing direction at time t2, for example, in order to lower the vehicle speed.

Assuming that the vehicle operator releases the accelerator pedal at time point t3, the throttle valve will immediately be shut to the fully-closed position or thereabout. As mentioned below, the shift controller controls the ratio (speed ratio) of the CVT by retrieving it from predefined characteristics (shift scheduling map) using the throttle opening and the vehicle speed as address data. The shift controller would therefore respond to the closing of the throttle valve by controlling the ratio to the high side at time point t3.

As a result, torque will fall and the vehicle speed will drop markedly. In response to the lowering of the vehicle speed, the cruise controller will move the throttle actuator in the throttle opening direction in order to raise the vehicle speed toward the desired speed. With this, the shift controller will control the speed ratio to the low side. However, since the throttle valve has been driven farther than necessary in the opening direction, the shift controller will further control the speed ratio to the low side. More torque than needed will therefore be produced.

When the vehicle speed approaches the desired speed, the cruise controller will restore the throttle valve in the closing direction. Since the speed ratio was controlled unnecessarily far toward the low side, the vehicle speed will overshoot the desired speed. In order to correct this, the cruise controller will control the throttle valve in the closing direction, causing the vehicle speed to undershoot, and in response to this, once again control it in the opening direction, causing torque to become insufficient.

These repeated ups and downs in the vehicle speed makes the vehicle operator feel uneasy and, at worst, may lead to control hunting. Although not illustrated, a similar situation may also arise when the vehicle operator releases the accelerator pedal too quickly. One of the causes for this inconvenience lies in the high-precision speed ratio control capability of the CVT.

Although the earlier prior art mentioned above teaches a cruise controller for vehicles equipped with a CVT, it does not go beyond simple measures such as fixing the speed ratio when the followup operation is in progress and is therefore incapable of offering a solution to the issues discussed above.

SUMMARY OF THE INVENTION

An object of this invention is to eliminate the drawbacks of the prior art by providing a vehicle speed control system that, when applied to a vehicle equipped with a CVT connected to the vehicle engine for transmitting the engine output torque while continuously varying the speed ratio of the CVT, can reduce throttle opening change when cruise control is effected so as to control the vehicle speed toward a desired speed in response to the instruction to cruise control inputted by the vehicle operator, thereby decreasing vehicle speed fluctuation.

For realizing this object, the present invention provides a system for controlling a speed of a vehicle having a continuously variable transmission which transmits output torque generated by an internal combustion engine mounted on the vehicle to drive wheels of the vehicle, and a cruise controller which controls the speed of the vehicle to a desired speed in response to an instruction to cruise control inputted by a vehicle operator, comprising: operating condition detecting means for detecting operating conditions of the engine and the vehicle including at least an opening of a throttle valve and the speed of the vehicle; a throttle actuator which is connected to the throttle valve to move the throttle valve; initialization conducting means for conducting initialization to drive the throttle actuator from an initial position to a position corresponding to the detected opening of the throttle valve at which the instruction to cruise control is inputted; and shift controlling means for controlling a speed ratio of the continuously variable transmission based at least on the detected opening of the throttle valve and the detected speed of the vehicle; wherein the shift controlling means controlling the speed ratio of the continuously variable transmission to a value, at which the instruction to cruise control is inputted, for a predetermined period of time since inputting of the instruction to cruise control.

BRIEF DESCRIPTION OF THE DRAWINGS

The above and other objects and advantages of the invention will be more apparent from the following description and drawings, in which.

DETAILED DESCRIPTION OF THE PREFERRED EMBODIMENTS

An embodiment of this invention will now be explained with reference to the attached drawings.

Figure 1:
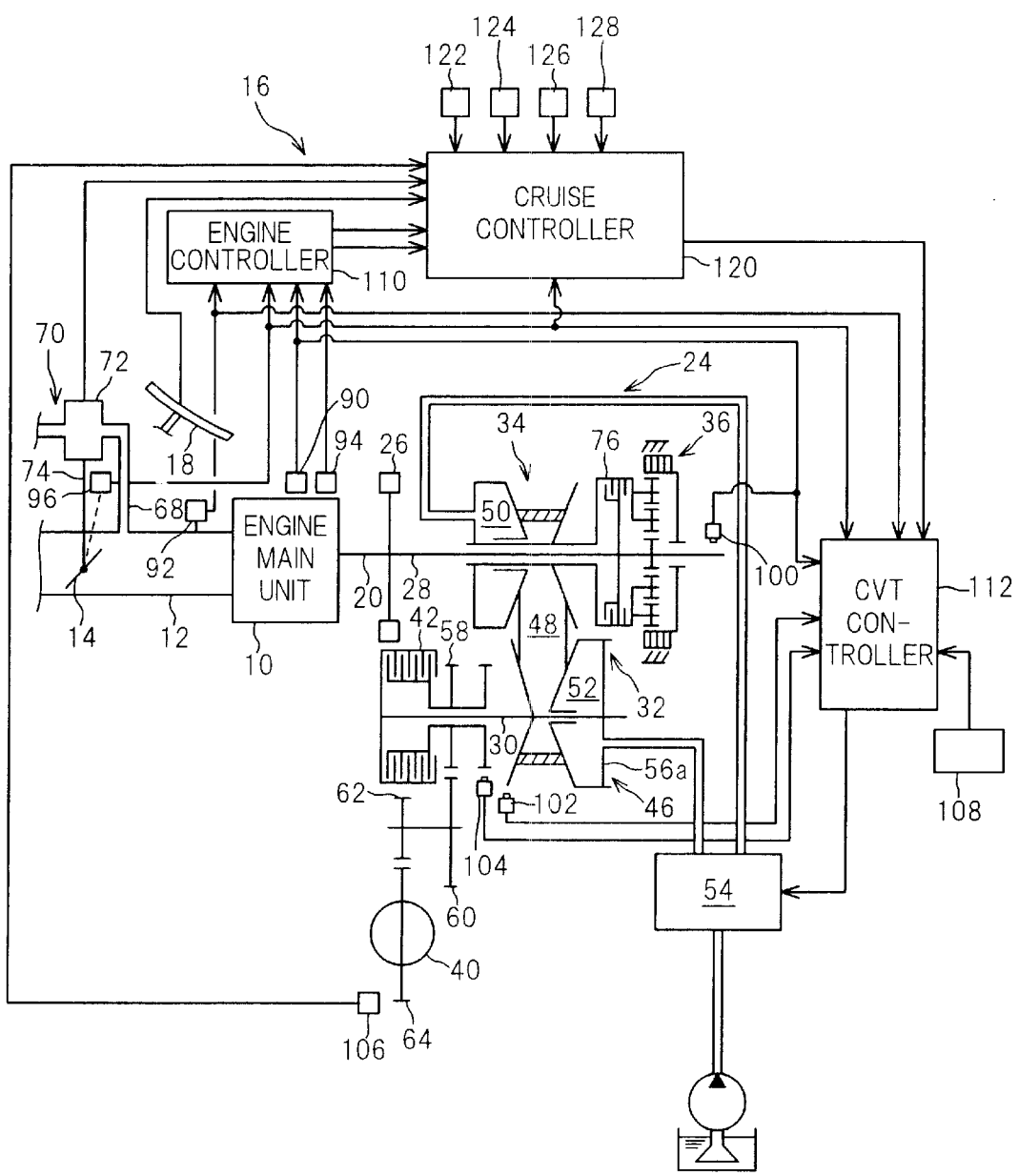
FIG. 1 is an overall schematic view showing an overall configuration of a vehicle speed control system according to the embodiment of the invention.

FIG. 1 is a schematic diagram illustrating the overall configuration of a vehicle speed control system according to this invention.

Reference numeral 10 in the drawing designates an internal combustion engine (hereinafter simply referred to as "engine") 10, more precisely the main unit of the engine 10. A throttle valve 14 is installed in an air intake pipe 12 of the engine 10. The throttle valve 14 is connected through a link mechanism (not shown) to an accelerator pedal 18 located on the floor of a vehicle 16 (partially represented by the engine 10 etc.) near the vehicle operator's seat (not shown). The throttle valve 14 opens and closes in response to manipulation of the accelerator pedal 18 by the vehicle operator.

The output shaft (crankshaft) 20 of the engine 10 is connected to a belt-type continuously variable transmission (hereinafter referred to as "CVT") 24. Specifically, the output shaft 20 of the engine 10 is connected through a dual-mass flywheel 26 to an input shaft 28 of the CVT 24.

The CVT 24 comprises a metal V-belt mechanism 32 located between the input shaft 28 and a counter shaft 30, a planetary gear-type forward/reverse switching mechanism 36 located between the input shaft 28 and a drive-side movable pulley 34, and a starter clutch 42 located between the counter shaft 30 and a differential 40. Power transmitted to the differential 40 is distributed to left and right driven wheels (not shown) through a drive shaft (not shown).

The metal V-belt mechanism 32 comprises the drive-side movable pulley 34 mounted on the input shaft 28, a driven-side movable pulley 46 mounted on the counter shaft 30, and a metal V-belt 48 wound about the two pulleys 34, 46.

The CVT 24 is equipped with a group of regulator valves (not shown) for determining pulley control oil pressure supplied to a drive-side cylinder chamber 50 and the driven-side cylinder chamber 52 of the metal V-belt mechanism 32, and with a group of speed-ratio control valves 54 for supplying the pulley control oil pressure to the cylinder chambers 50 and 52. These set appropriate lateral pulley pressures at which no V-belt 48 slip occurs and vary the pulley width of the pulleys 34, 46 to vary the radius of the V-belt 48 wound about the pulleys 34, 46, thereby continuously varying the speed ratio (named "ratio i").

The starter clutch 42 is for ON/OFF (engage/disengage) connection between the counter shaft 30 and the differential 40. When the starter clutch 42 is ON (engaged), the engine output torque, varied by the metal V-belt mechanism 32, is transmitted through gears 58, 60, 62 and 64 to the differential 40, which divides and transmits it to the left and right drive wheels (not shown). When the starter clutch 42 is OFF (disengaged), the CVT 24 assumes a neutral state.

A branch pipe 68 is connected to the air intake pipe 12 downstream of the throttle valve 14 and the other end of the branch pipe 68 is connected to a throttle actuator 70 The throttle actuator 70 is equipped with a vacuum valve (electromagnetic solenoid valve) 72 for opening and closing the branch pipe 68, and a diaphragm (not shown) for defining a negative pressure chamber connected with the branch pipe 68. The degree of opening of the branch pipe 68 is varied through the operation of the vacuum valve 72 so as to increase or decrease the negative (suction) pressure in the negative pressure chamber and thus vary the position of the diaphragm. The diaphragm is connected to a link 74, whose other end is connected to the throttle valve 14.

The opening of the throttle valve 14 can therefore be controlled by operating the vacuum valve 72. The throttle actuator 70 is thus constituted as a negative-pressure type actuator. Since the details of this arrangement are set out in Japanese Laid-open Patent Application No. Hei 9 (1997)-207616, the explanation here will be limited to the foregoing.

It should be noted that, when the vehicle operator operates the accelerator pedal 18 while the throttle valve 14 is being moved by the throttle actuator 70, the vehicle operator's operation takes precedence in such a way that the throttle valve 14 is opened or closed in response to the desire of the vehicle operator, overcoming the driving force of the throttle actuator 70. When no instruction to cruise control has been input, the throttle actuator 70 is placed at a non-energized location (initial position) corresponding to the fully-closed position of the throttle valve 14.

Although not shown in the drawing, the system according to this embodiment is provided with a radar unit. The radar unit monitors the distance to another vehicle running ahead, and enables to conduct a followup operation, if desired, to followup another vehicle with a prescribed inter-vehicle distance from the subject vehicle 16, parallel to the operation of cruise control.

A crank angle sensor 90 is provided at an appropriate location in the engine 10, such as near the camshaft (not shown) and generates a signal proportional to the piston crank angular positions (one of which is counted and used to determine the engine speed NE). A manifold absolute pressure sensor 92 is installed in the air intake pipe 12 at an appropriate location downstream of the throttle valve 14 and generates a signal proportional to the manifold absolute pressure PBA (the engine load).

A coolant temperature sensor 94 is provided at an appropriate location at the cylinder block (not shown) and generates a signal proportional to the engine coolant temperature TW. A throttle position sensor 96 is installed in the vicinity of the throttle valve 14 and generates a signal proportional to the throttle opening or position θTH.

In the CVT 24, a first speed sensor 100 is provided near the input shaft 28 and generates a signal proportional to the rotational speed NDR of the input shaft 28. A second speed sensor 102 is provided near the driven-side movable pulley 46 and generates a signal proportional to the rotational speed of the driven-side movable pulley 46, i.e. the rotational speed NDN of the input shaft (counter shaft 30) of the starter clutch 42. A third speed sensor 104 is provided near the gear 58 and generates a signal proportional to the rotational speed of the gear 58, i.e. the rotational speed NOUT of the output shaft of the starter clutch 42.

A vehicle speed sensor 106 is provided near the drive shaft (not shown) connected to the differential 40 and generates a signal proportional to the vehicle (travelling) speed V. A shift lever position switch 108 is provided in the vicinity of the shift lever (not shown) installed on the vehicle floor near the vehicle operator's seat and generates a signal proportional to the range position (D, N, P . . . ) selected by the vehicle operator.

The system is equipped with an engine controller 110 comprising a microcomputer and a CVT controller 112 also comprising a microcomputer. The outputs of the crank angle sensor 90, the manifold absolute pressure sensor 92, the coolant temperature sensor 94 and the throttle position sensor 96 are input to the engine controller 110. The engine controller 110 controls the operation of the engine 10 based on the input values.

The outputs of the throttle position sensor 96, vehicle speed sensor 106, first to third speed sensors 100, 102 and 104, and the shift lever position switch 108 are input to the CVT controller 112. The CVT controller 112 controls the ratio i through the aforesaid groups of valves based on the input values.

Specifically, the CVT controller 112 determines a desired engine speed NED by retrieving a shift scheduling map (explained later) using the vehicle speed V and the throttle opening θTH as address data. It then determines a desired value of NDR (desired NDR) for achieving the determined (retrieved) desired engine speed NED and operates the movable pulleys 34, 46 through the valve groups such that the determined desired NDR is achieved. Since NDR is the rotational speed of the drive-side movable pulley 34 of the CVT 24, ratio i can solely be determined by defining the desired value (desired NDR) relative to the vehicle speed V.

The system is also provided with a cruise controller 120 also comprising a microcomputer. The outputs of the throttle position sensor 96 and the vehicle speed sensor 106 are input to the cruise controller 120.

In the vicinity of the steering wheel (not shown) installed near the operator's seat of the vehicle 16 are provided a set switch 122 which generates an ON signal, when manipulated by the vehicle operator, indicative of his or her desire to implement cruise control (instruction to cruise control) and to set (input) the vehicle speed (desired vehicle speed), a resume switch 124 which generates an ON signal, when manipulated by the vehicle operator, indicative of his or her desire to resume cruise control after the instruction to cruise control has been interrupted or canceled by braking or the like, and a cancel switch 126 which generates an ON signal, when manipulated by the vehicle operator, indicative of his or her desire to cancel the instruction to cruise control.

A brake switch 128 is installed in the vicinity of the brake pedal (not shown) and generates an ON signal when the vehicle operator depresses the brake pedal for braking.

The outputs of the foregoing switches 122 to 128 are input to the cruise controller 120. Based on the outputs of the switches, the cruise controller 120 recognizes the instruction to cruise control and implements cruise control via the throttle actuator 70 as explained later. Further, if required, it conducts the followup operation.

The operation of the vehicle speed control system according to the embodiment will now be explained.

Figure 2:
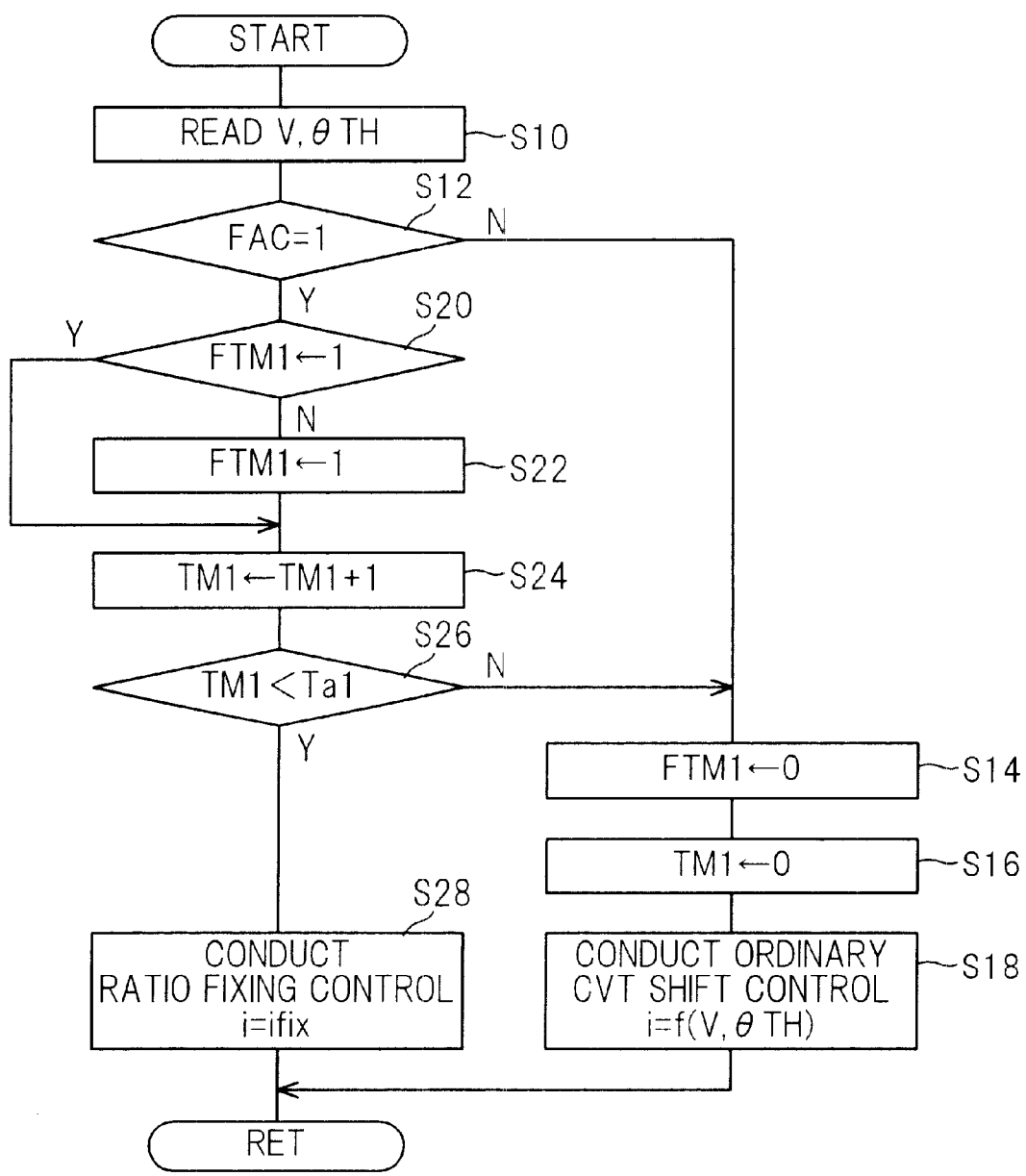
FIG. 2 is a flow chart showing the operation of the system, more particularly the operation conducted by a CVT controller in the system illustrated in FIG. 1.

FIG. 2 is a flow chart showing the operation of the system. The illustrated program is executed by the CVT controller 112 at prescribed time intervals of, for instance, 20 msec.

The program begins in S10 in which the detected vehicle speed V and throttle opening θTH are read and proceeds to S12 in which it is determined whether the bit of a flag FAC is set to 1. The bit of this flag is set to 1 in a processing conducted by the cruise controller 120 when the vehicle operator inputs the instruction to cruise control.

Therefore, the processing of this step amounts to a discrimination as to whether the instruction to cruise control has been input. When the instruction to cruise control is input, the cruise controller 120 also carries out the initialization (initial operation) mentioned earlier, i.e. drives the throttle actuator 70 to a position corresponding to the current throttle opening.

This processing conducted by the cruise controller 120 will now be explained.

Figure 3:
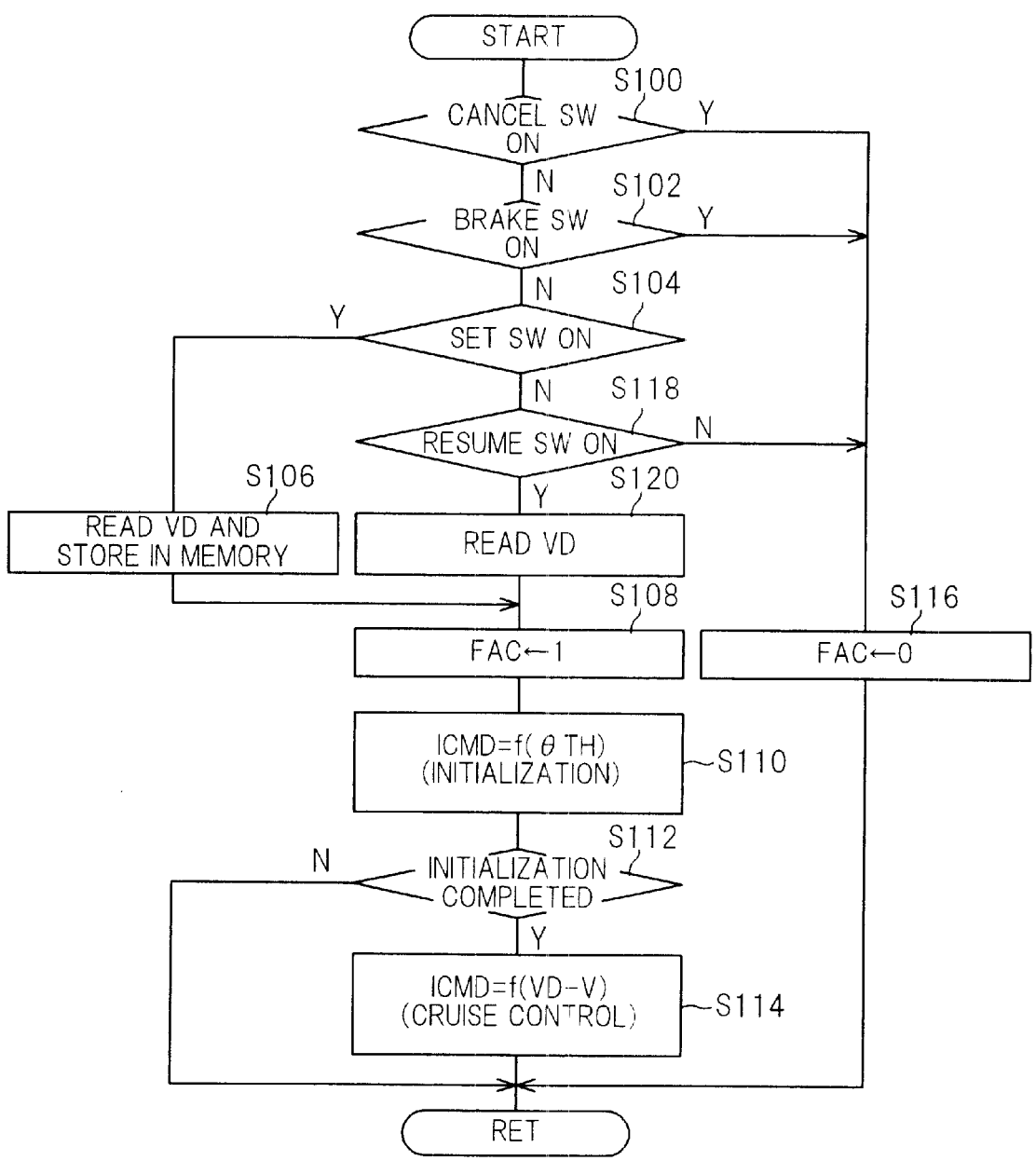
FIG. 3 is a flow chart showing the operation of the system, more particularly the operation conducted by a cruise controller in the system illustrated in FIG. 1.

FIG. 3 is a flow chart showing this processing. The illustrated program is executed once every 200 msec, for example.

The program begins in S100 in which it is determined whether the cancel switch 126 generates the ON signal, i.e. whether the vehicle operator has canceled the instruction to cruise control. When the result is NO, the program proceeds to S102 in which it is determined whether the brake switch 128 generates the ON signal, i.e. whether braking is being conducted.

When the result in S102 is NO, the program proceeds to S104 in which it determined whether the set switch 122 is ON, i.e. whether the vehicle operator has inputted the intention to cruise at a set vehicle speed.

When the result in S104 is YES, the program proceeds to S106 in which the set vehicle speed (desired vehicle speed VD) inputted through the set switch 122 is read and stored in memory, and to S108 in which the bit of the flag FAC is set to 1. In other words, it is determined that the vehicle operator has inputted the intention to cruise.

The program then proceeds to S110 in which the aforesaid initialization is conducted.

Specifically, since the throttle actuator 70 is at the non-energized position (position corresponding to the fully-closed throttle position) until the instruction to cruise control is inputted, a current command value ICMD required to drive the throttle actuator 70 (more precisely, the link 74) to the position corresponding to the throttle opening at the time the instruction to cruise control was input is determined or calculated and outputted through a driver (not shown) to the vacuum valve 72 to operate the throttle actuator 70.

The program proceeds to S112 in which it is determined whether the initialization has been completed, i.e. whether driving of the throttle actuator 70 to the position corresponding to the throttle opening at the time the cruise command was inputted has been completed.

When the result in S112 is NO, the remaining processing steps are skipped. When it is YES, the program proceeds to S114 in which the current command value ICMD to be supplied to the vacuum valve 72 of the throttle actuator 70 is calculated in accordance with the difference between the set vehicle speed (desired vehicle speed VD) and the detected vehicle speed V using a PID control rule or the like. In other words, since the initialization has been completed, the processing shifts to the cruise control, i.e. control for converging the vehicle speed V to the desired vehicle speed VD.

On the other hand, when the result in S100 or S102 is YES, the program proceeds to S116 in which the bit of the flag FAC is reset to 0. When the result in S104 is NO, the program proceeds to S118 in which it is determined whether the resume switch 124 generates the ON signal, i.e. whether the vehicle operator has inputted the instruction to resume cruise control.

When the result in S118 is YES, the program proceeds to S120 in which the set vehicle speed (desired vehicle speed VD) stored in memory is read, and then to S108. When the result is NO, the program proceeds to S116 in which the bit of the flag FAC is reset to 0.

The explanation of FIG. 2 will now be continued.

When the result in S12 is NO, the program proceeds to S14 in which the bit of a flag FFM1 (explained below) is reset to 0, to S16, in which a value TM1 (explained below) of a timer (up-counter) is reset to zero, and to S18, in which CVT shift control is conducted.

Figure 4:
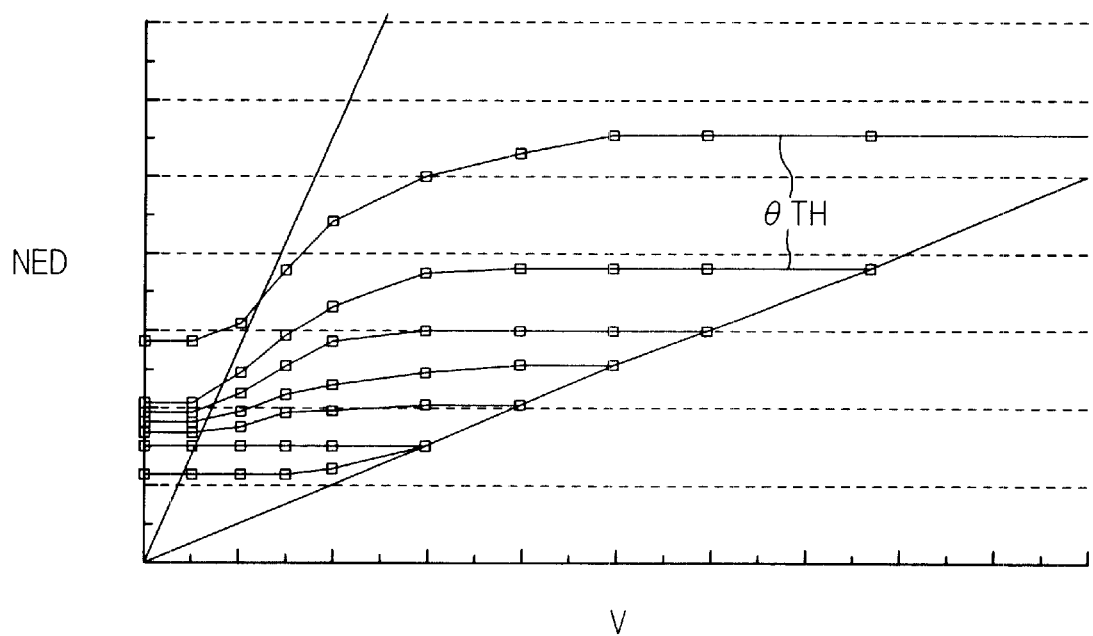
FIG. 4 is a graph showing characteristics of a shift scheduling map referred to in the flow chart of FIG. 2.

The specific operations conducted by the CVT controller 112 are, as mentioned earlier, to determine the ratio i by retrieving it from a shift scheduling map (whose characteristics are shown in FIG. 4) using the detected vehicle speed V and throttle opening θTH as address data and to control the CVT 24 such that the actual ratio converges to the desired ratio. Still more specifically, the CVT controller 112 determines the desired engine speed NED by retrieval from the map (whose characteristics are shown in FIG. 4) using the detected vehicle speed V and the throttle opening θTH as address data, determines the desired NDR which can achieve the determined desired engine speed NED, and drives the movable pulleys 34, 46 through the valve group 54 and some similar elements such that the desired NDR is realized.

It may alternatively be possible to use the desired engine speed NED for immediately (directly) driving the movable pulleys 34, 46 in accordance with appropriate characteristics or to use the desired engine speed NED to determined a desired ratio between NDR and NDN and drive the movable pulleys 34, 46 such that this desired ratio is realized. The terms "control of (speed) ratio i" or "CVT shift control" used in this specification are defined to encompass all of these three types of control.

On the other hand, when the result in S12 is YES, the program proceeds to S20 in which it is determined whether the bit of the flag FTM1 is set to 1. Since the bit of this flag is initially set to 0, the result is normally NO during the first program loop and the program proceeds to S22 in which the bit of the flag FTM1 is set to 1. When the result in S20 is YES, the program skips S22.

The program then proceeds to S24 in which the timer value TM1 is incremented. In other words, the setting of the bit of the flag FTM1 to 1 amounts to incrementing the timer value, i.e. to start the measurement of elapsed time.

The program then proceeds to S26 in which it is determined whether the timer value TM1 is less than a prescribed period of time ta1. When the result is YES, the program proceeds to S28 in which CVT shift control is similarly conducted, except that in this case, the ratio i is fixed. More specifically, ratio i is fixed at its value fix at the time the instruction to cruise control was inputted.

When the result in S26 is NO, i.e. when the prescribed period of time Ta1 has passed or elapsed, the program proceeds, through S14 and S16, to S18 in which the CVT shift control is conducted in an ordinary or normal manner.

Figure 5:
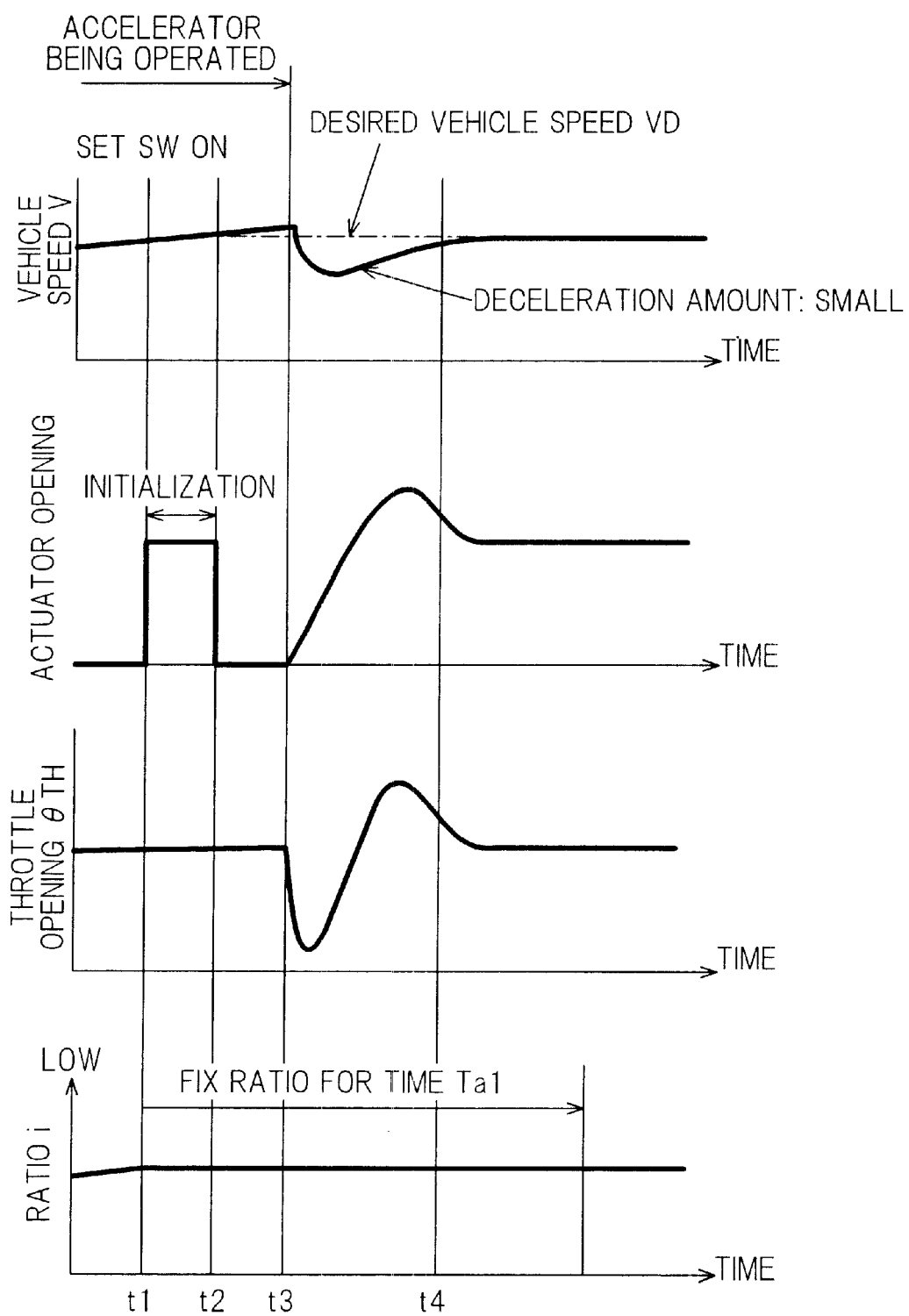
FIG. 5 is a time chart showing the operation of the system illustrated in the flow chart of FIG. 2.
Figure 14:
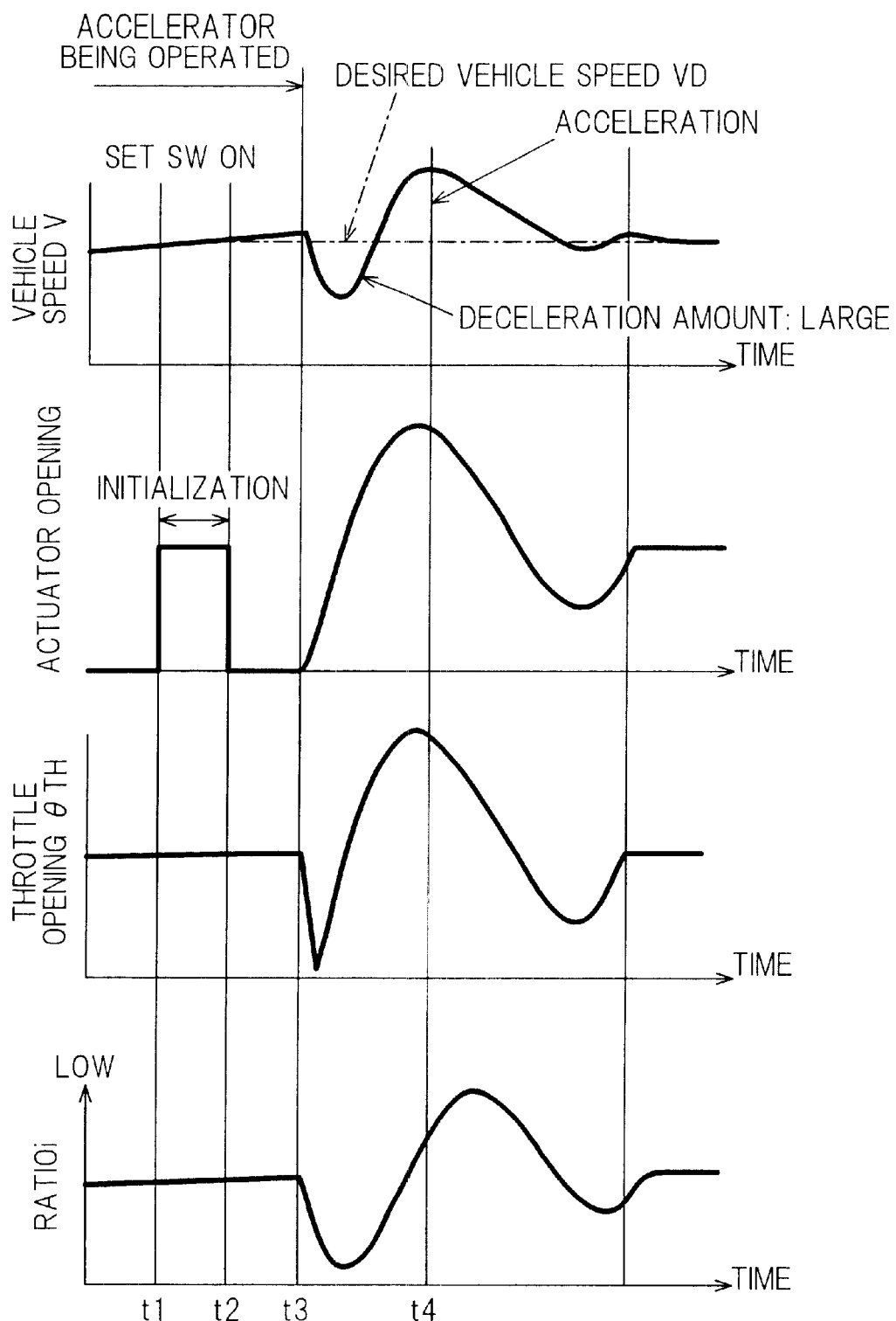
FIG. 14 is a time chart showing the operation of a prior art system.

FIG. 5 is a time chart similar to that of FIG. 14 showing this control. In this embodiment, after the instruction to cruise control is inputted, the ratio i is fixed at the ratio fix (the ratio at the time the instruction to cruise control was inputted), for a prescribed period of time Ta1.

With this, as can be seen from the time chart, throttle opening change can be reduced and hence, vehicle speed fluctuation is decreased. As can be seen in FIG. 5, the prescribed period of time Ta1 is set to include a period of time in the immediate wake of or incidental to the initialization.

Owing to the aforesaid configuration, the system according to this embodiment can avoid occurrence of the inconvenience explained with reference to FIG. 14, can reduce throttle opening change, and, as a result, can decrease variation in vehicle speed when the cruise control is effected.

Figure 6:
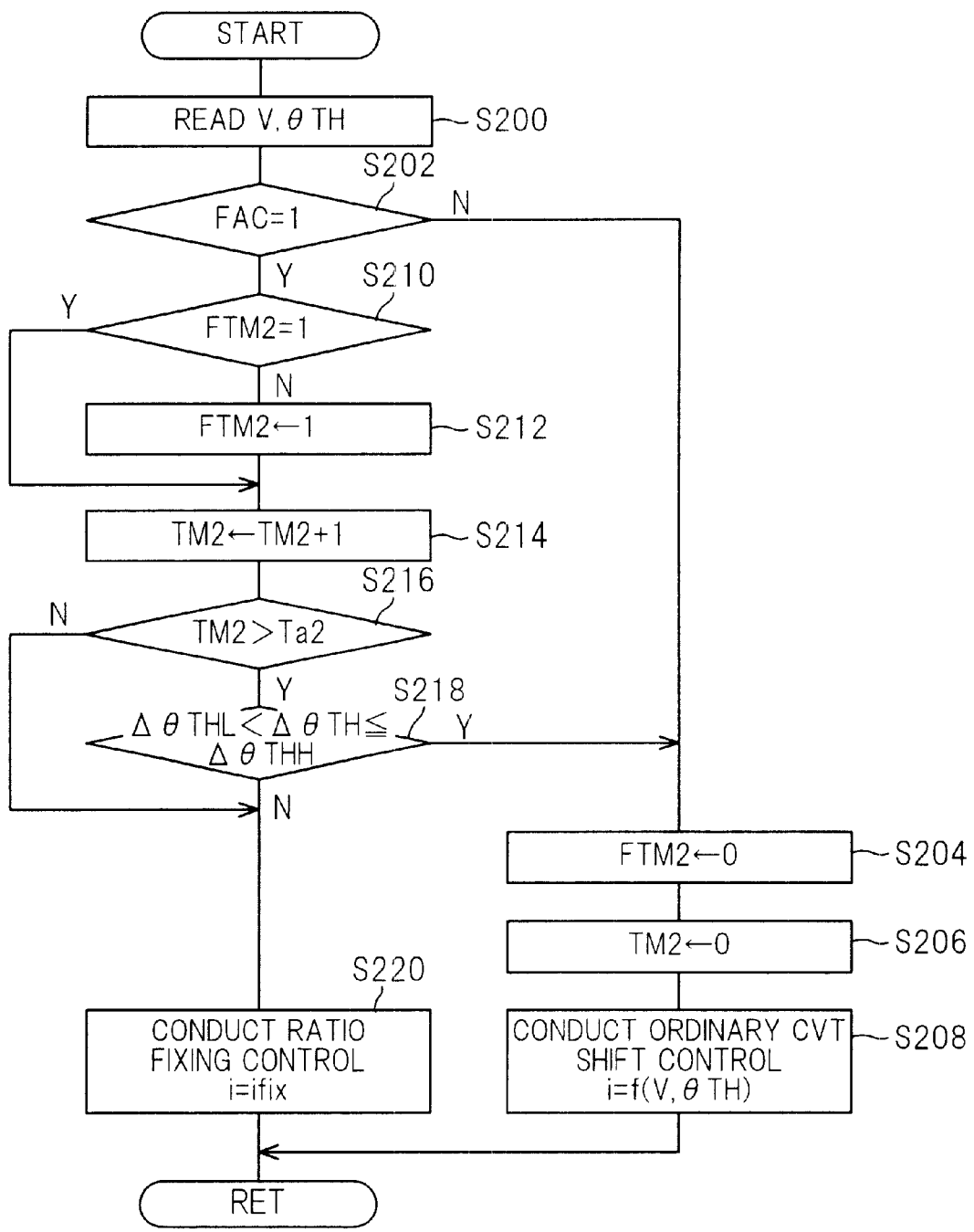
FIG. 6 is a view, similar to FIG. 2, but showing the operation of a vehicle speed control system according to a second embodiment of the invention.

FIG. 6 is a flow chart, similar to that of FIG. 2, but showing the operation of a vehicle speed control system according to a second embodiment of this invention.

Explaining this, the program begins in S200 in which the detected vehicle speed V and throttle opening θTH are read, and proceeds to S202 in which it is determined whether the bit of a flag FAC is set to 1.

When the result in S202 is NO, the program proceeds to S204 in which the bit of a flag FTM2 is reset to 0, to S206 in which a value TM2 of a timer (up-counter) is reset to zero, and to S208 in which the CVT shift control is conducted in the manner explained with reference to S18 in FIG. 2 of the first embodiment.

On the other hand, when the result in S202 is YES, the program proceeds to S210 in which it is determined whether the bit of the flag FTM2 is set to 1. When the result is NO, the program proceeds to S212 in which the bit of the flag FTM2 is set to 1, and to S214 in which the timer value TM2 is incremented to start measurement of elapsed time.

The program then proceeds to S216 in which it is determined whether the timer value TM2 is greater than a prescribed period of time Ta2. When the result is YES, the program proceeds to S218 in which it is determined whether the throttle opening change ΔθTH is greater than a prescribed value ΔθTHL and is less than a prescribed value ΔθTHH.

The throttle opening change ΔθTH indicates the difference between the values of the throttle opening θTH in current and preceding cycles, i.e. the difference (or differential) between the throttle opening detected in the preceding loop of the flow chart of FIG. 6 and that detected in the current loop. The processing of S218 amounts to a determination as to whether or not the throttle opening θTH has stabilized (i.e. the movement or motion of the throttle valve 14 has stabilized). The prescribed values ΔθTHL and ΔθTHH are therefore appropriately selected as values sufficient for discriminating whether the throttle opening θTH has stabilized.

When the result in S216 is NO, the processing of S218 is skipped. The value of the prescribed period of time Ta2 is set by, in FIG. 5, determining the period of time between the completion of initialization at time point t2 and an appropriate time point, following the start of the cruise control (after the initialization), at which the throttle opening θTH has stabilized, e.g. the time point t4.

When the result in S216 or S218 is NO, the program proceeds to S220 in which, similarly to what was explained with reference to S28 in FIG. 2 of the first embodiment, the ratio i is fixed at the value ifix at the time the instruction to cruise control was inputted.

When the result in S218 is YES, since this indicates that the throttle opening θTH has stabilized, the program therefore proceeds, through S204 and S206, to S208 in which the CVT shift control is conducted in the ordinary manner.

Having been configured in the foregoing manner, the system according to the second embodiment can also respond to the instruction to cruise control inputted by fixing the speed ratio until the throttle opening θTH has stabilized after the prescribed period of time since the inputting of the instruction to cruise control has elapsed, it can, avoid occurrences of the inconvenience explained with reference to FIG. 14, reduce throttle opening change, and, as a result, decrease variation in vehicle speed when the cruise control is effected. The rest of the configuration as well as the effects and advantages thereof is the same as the first embodiment.

Figure 7:
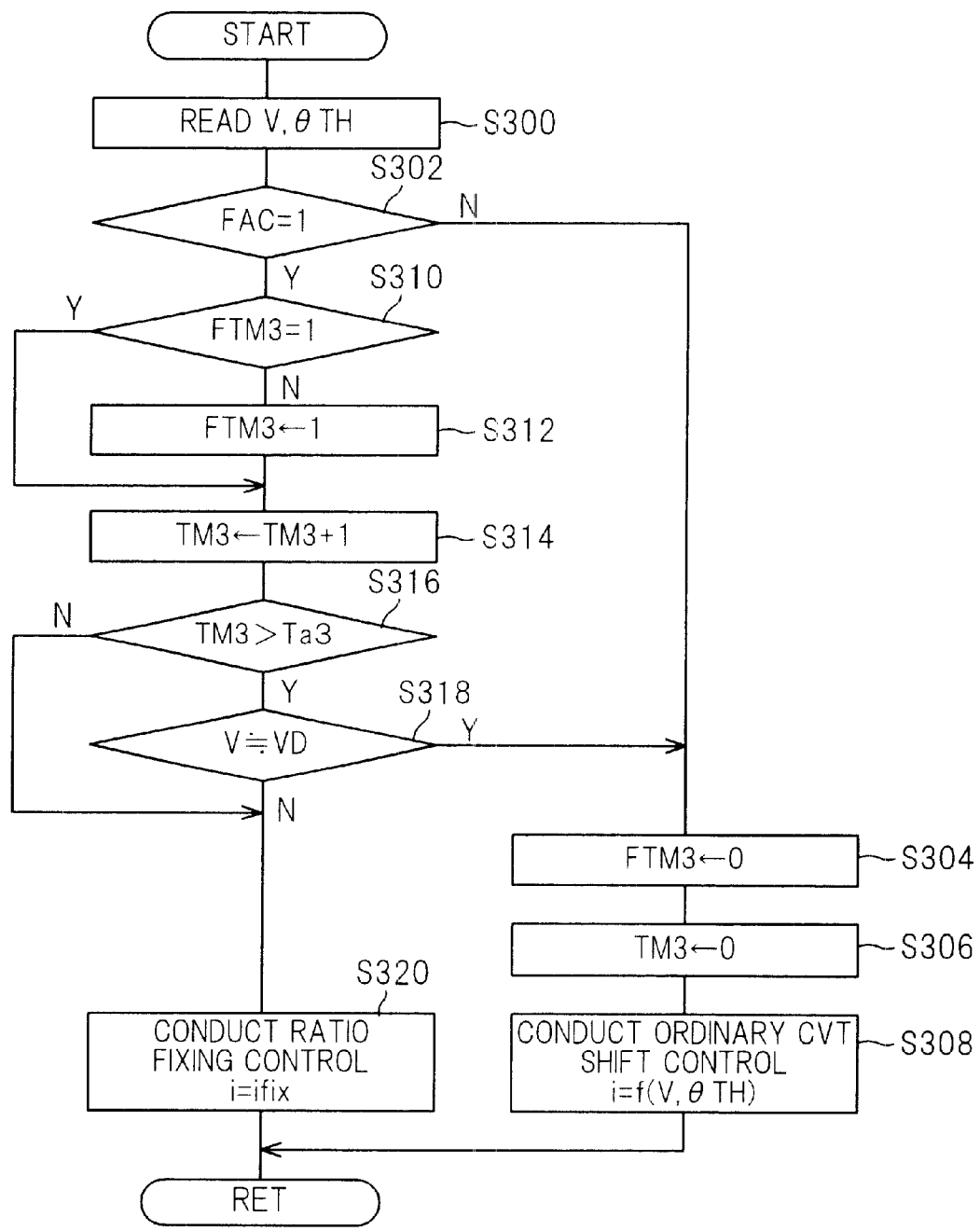
FIG. 7 is a view, similar to FIG. 2, but showing the operation of a vehicle speed control system according to a third embodiment of the invention.

FIG. 7 is a flow chart, similar to that of FIG. 2, but showing the operation of a vehicle speed control system according to a third embodiment of this invention.

The program begins in S300 in which the detected vehicle speed V and throttle opening θTH are read and proceeds to S302 in which it is determined whether the bit of a flag FAC is set to 1.

When the result in S302 is NO, the program proceeds to S304 in which the bit of a flag FTM3 is reset to 0, to S306 in which a value TM3 of a timer (up-counter) is reset to zero, and to S308 in which the CVT shift control is conducted in the manner explained with reference to S18 in FIG. 2 of the first embodiment.

On the other hand, when the result in S302 is YES, the program proceeds to S310 in which it is determined whether the bit of the flag FTM3 is set to 1. When the result is NO, the program proceeds to S312 in which the bit of the flag FTM3 is set to 1 and to S314 in which the timer value TM3 is incremented to start measurement of elapsed time.

The program proceeds to S316 in which it is determined whether the timer value TM3 is greater than a prescribed period of time Ta3. When the result is YES, the program proceeds to S318 in which it is determined whether the detected vehicle speed V is substantially (or exactly) equal to the set speed (desired speed) VD. The processing of S318 amounts to determining whether or not the vehicle speed V is converging to the desired value VD.

When the result in S316 is NO, the processing of S318 is skipped. The value of the prescribed period of time Ta3 is set similarly to that of the prescribed period of time Ta2 of the second embodiment, i.e. by, in a figure similar to FIG. 5, determining the period of time between the completion of initialization at time point t2 and an appropriate time point, following the start of the cruise control, at which the throttle opening (and vehicle speed V) moves toward convergence, e.g. the time point t4.

When the result in S316 or S318 is NO, the program proceeds to S32 in which, similarly to what was explained regarding S28 of the first embodiment, the ratio i is fixed at the value ifix at the time the instruction to cruise control was inputted.

When the result in S318 is YES, since this indicates that the vehicle speed V is converging on the set vehicle speed (desired speed) VD, the program therefore proceeds, through S304 and S306, to S308 in which the CVT shift control is conducted in the ordinary manner.

Having been configured in the foregoing manner, the system according to the third embodiment can also respond to the instruction to cruise control inputted by fixing the speed ratio until the detected vehicle speed V is substantially (or exactly) equal to the desired vehicle speed VD for the prescribed period of time since the inputting of the instruction to cruise control has elapsed, it can, avoid occurrence of the inconvenience explained with reference to FIG. 14, reduce throttle opening change, and, as a result, can decrease variation in vehicle speed when the cruise control is effected. The rest of the configuration as well as the effects and advantages thereof is the same as the first embodiment.

Figure 8:
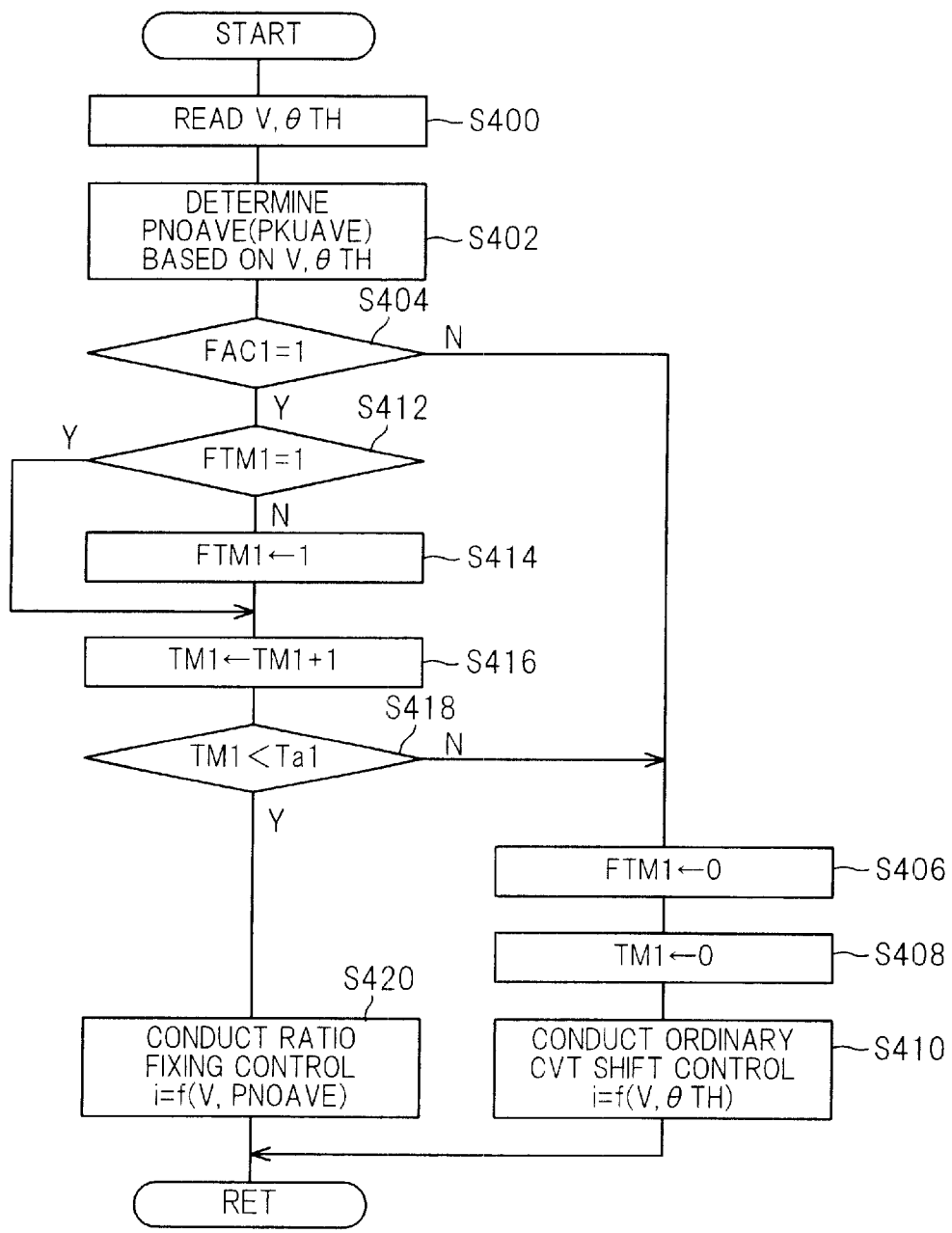
FIG. 8 is a view, similar to FIG. 2, but showing the operation of a vehicle speed control system according to a fourth embodiment of the invention.

FIG. 8 is a flow chart, similar to that of FIG. 2, but showing the operation of a vehicle speed control system according to a fourth embodiment of this invention.

The program begins in S400 in which the detected vehicle speed V and real throttle opening θTH are read and proceeds to S402 in which parameters PNOAVE and PKUAVE indicative of the running resistance or load acting on the vehicle 16 are determined or calculated based on the detected vehicle speed V and throttle opening θTH. More specifically, a parameter PNOAVE indicative of vehicle upslope or a parameter PKUAVE indicative of downslope of the road on which the vehicle 16 travels, is determined or calculated.

Figure 9:
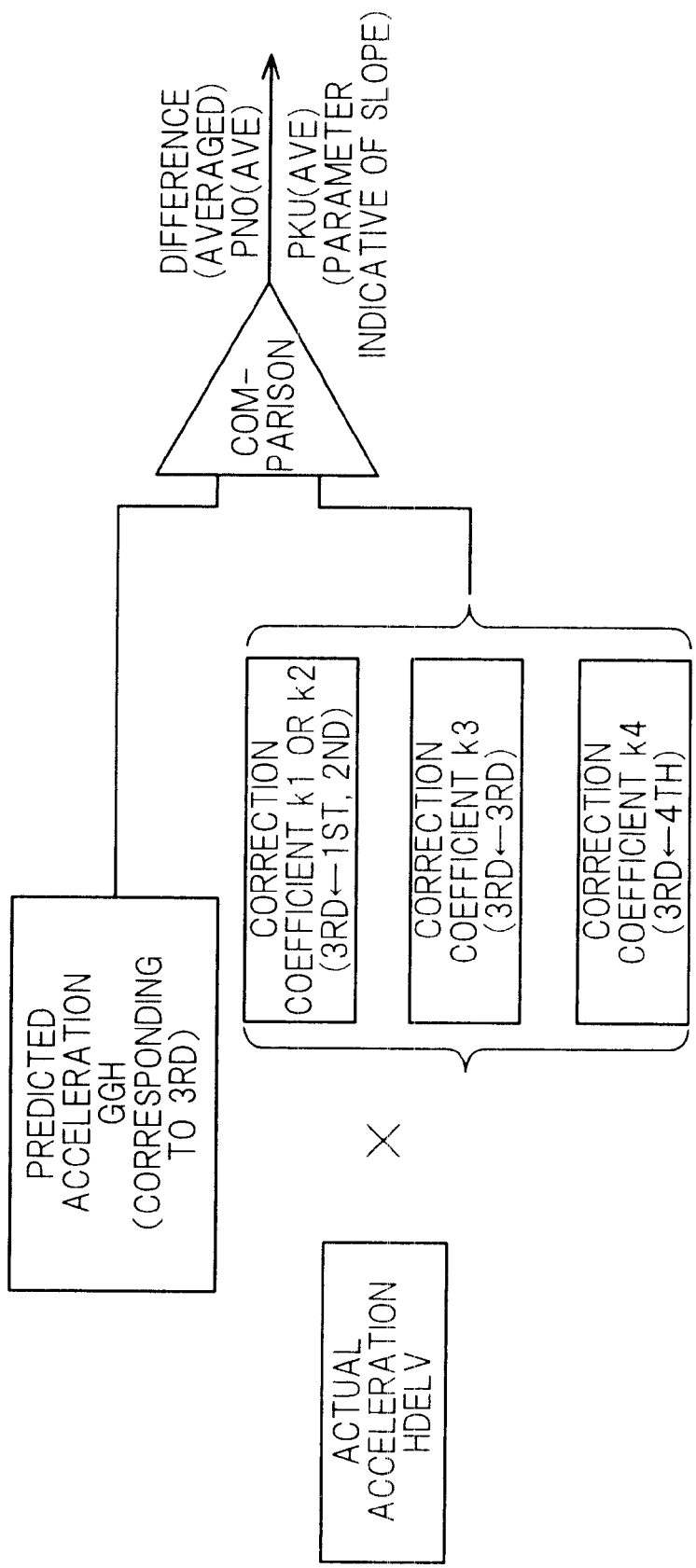
FIG. 9 is a view showing the determination of a running resistance, more specifically a parameter indicative of upslope (or downslope on which the vehicle travels) referred to in the flow chart of FIG. 8.

This determination, which is explained in detail in Japanese Laid-open Patent Application No. Hei 5(1993)-71625 etc. proposed by the assignee, will be briefly explained with reference to FIG. 9. The predicted acceleration anticipated for the vehicle 16 when traveling on a flat road is determined by retrieving data for each of the third gear (speed) from predetermined mapped characteristics using the vehicle speed V and the throttle opening θTH as address data.

On the other hand, the first-order difference of the vehicle speed V is used to determined or calculate the actual acceleration that has actually been produced in the vehicle 16, and a correction coefficient kn is determined by retrieving data from predetermined mapped characteristics again using the vehicle speed V and the throttle opening θTH as address data. Then the actual acceleration is multiplied by the correction coefficient kn to be corrected as that corresponding to the third gear.

Next, the difference between the calculated predicted accelerations and the actual acceleration is calculated and averaged. Specifically, when the difference obtained by subtracting the actual acceleration from the predicted acceleration is a positive value, the value is defined as PNO (the average value thereof being PNOAVE, the parameter indicative of upslope of the road on which the vehicle 16 travels). When the difference is negative, it follows that the value obtained by subtracting the predicted acceleration from the actual acceleration will be a positive value and this is defined as PKU (the average value thereof being PKUAVE, the parameter indicative of downslope of the road on which the vehicle 16 travels).

In the technique proposed earlier by the assignee, the parameter PNOAVE or PKUAVE is used to select one from among five shift scheduling maps prepared beforehand for flat-road driving, moderate uphill driving etc. and a gear (speed) is determined by retrieving the selected map with the detected throttle opening θTH and the vehicle speed V. In the system according to this embodiment, the determined parameter PNOAVE or PKUAVE, more specifically PNOAVE only, is used as a CVT shift control parameter in place of the throttle opening θTH.

Returning to the explanation of FIG. 8, the program proceeds to S404 in which it is determined whether the bit of the flag FAC is set to 1.

When the result in S404 is NO, the program proceeds to S406 in which the bit of the flag FTM1 is reset to 0, to S408 in which the timer value TM1 is reset to zero, and to S410, in which, as explained with regard to S18 of the first embodiment, the ordinary CVT shift control is conducted wherein the ratio i is determined by map-retrieval using the vehicle speed V and throttle opening θTH as address data.

On the other hand, when the result in S404 is YES, the program proceeds to S412 in which it is determined whether the bit of the flag FTM1 is set to 1. When the result is NO, the program proceeds to S414 in which the bit of the flag FTM1 is set to 1, and to S416 in which the timer value TM1 is incremented to start measurement of elapsed time.

The program then proceeds to S418 in which it is determined whether the timer value TM1 is less than the prescribed period of time ta1. When the result is YES the program proceeds to S420 in which ratio restriction processing is conducted. Specifically, the ratio (speed ratio) i is determined or calculated by retrieval from a shift scheduling map (whose characteristics are shown in FIG. 10) using the detected vehicle speed V and the upslope parameter PNOAVE as address data, and the CVT 24 is controlled to achieve the so-determined ratio i When the result in S418 is NO, since this indicates that the time corresponding to the timer value TM1 has passed or elapsed, the program proceeds, through S406 and S408, to S410 in which the CVT shift control is conducted in the ordinary manner using the vehicle speed V and the throttle opening θTH as address data.

Figure 11:
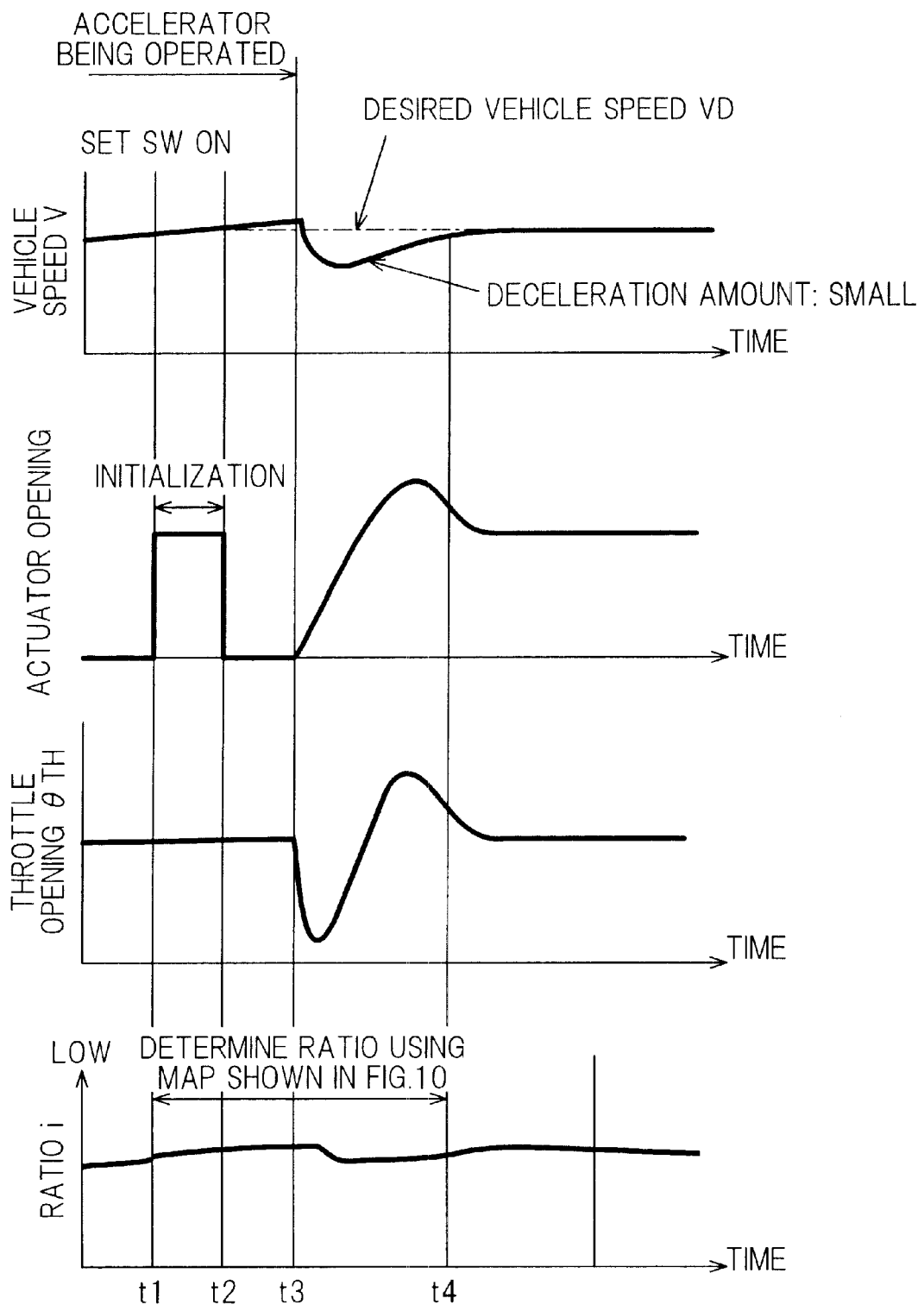
FIG. 11 is a time chart showing the operation of the system illustrated in the flow chart of FIG. 8.

The nature of the control effected by the fourth embodiment is illustrated in FIG. 11.

Figure 10:
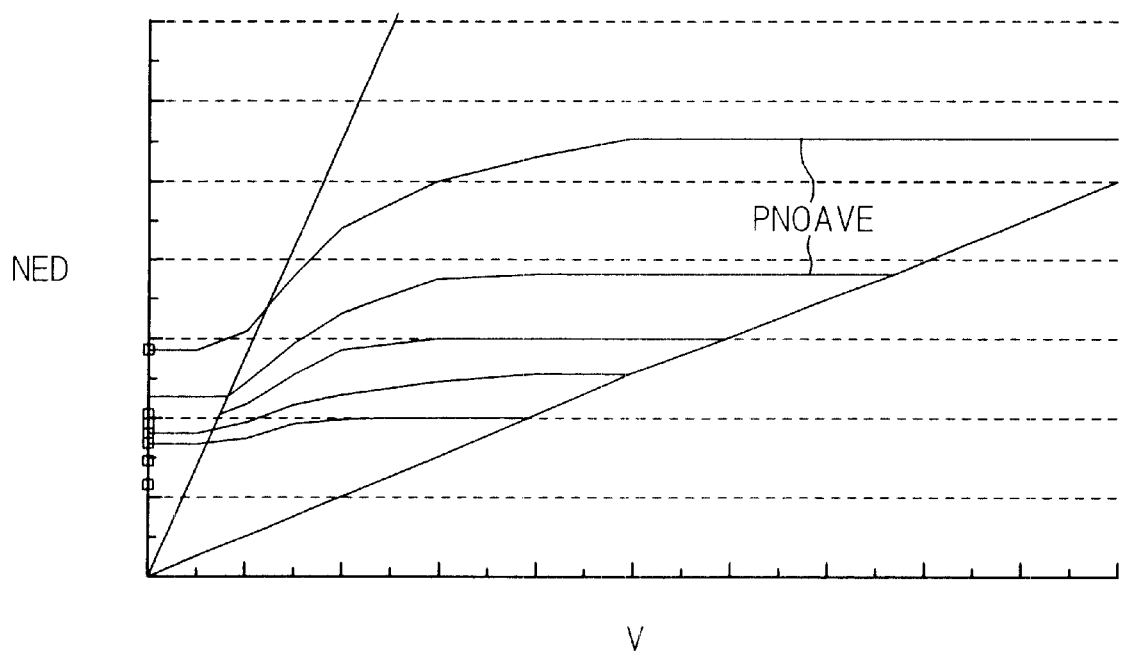
FIG. 10 is a graph showing characteristics of a shift scheduling map referred to in the flow chart of FIG. 8.

As shown, for the prescribed period of time (ta1) since the inputting of the instruction to cruise control, the ratio i is determined by retrieving from the shift scheduling map (whose characteristics are shown in FIG. 10) using the vehicle speed V and the parameter PNOAVE indicative of upslope as address data.

In other words, the system according to this embodiment is configured so as not to use the throttle opening θTH as the parameter for the CVT shift control such that the control is unaffected by any fluctuation that may occur in the throttle opening θTH. The system according to the fourth embodiment therefore can avoid occurrence of the inconvenience explained with reference to FIG. 14, can reduce throttle opening change and decrease variation in vehicle speed when the cruise control is effected. The rest of the configuration as well as the effects and advantages thereof is the same as the first embodiment.

Figure 12:
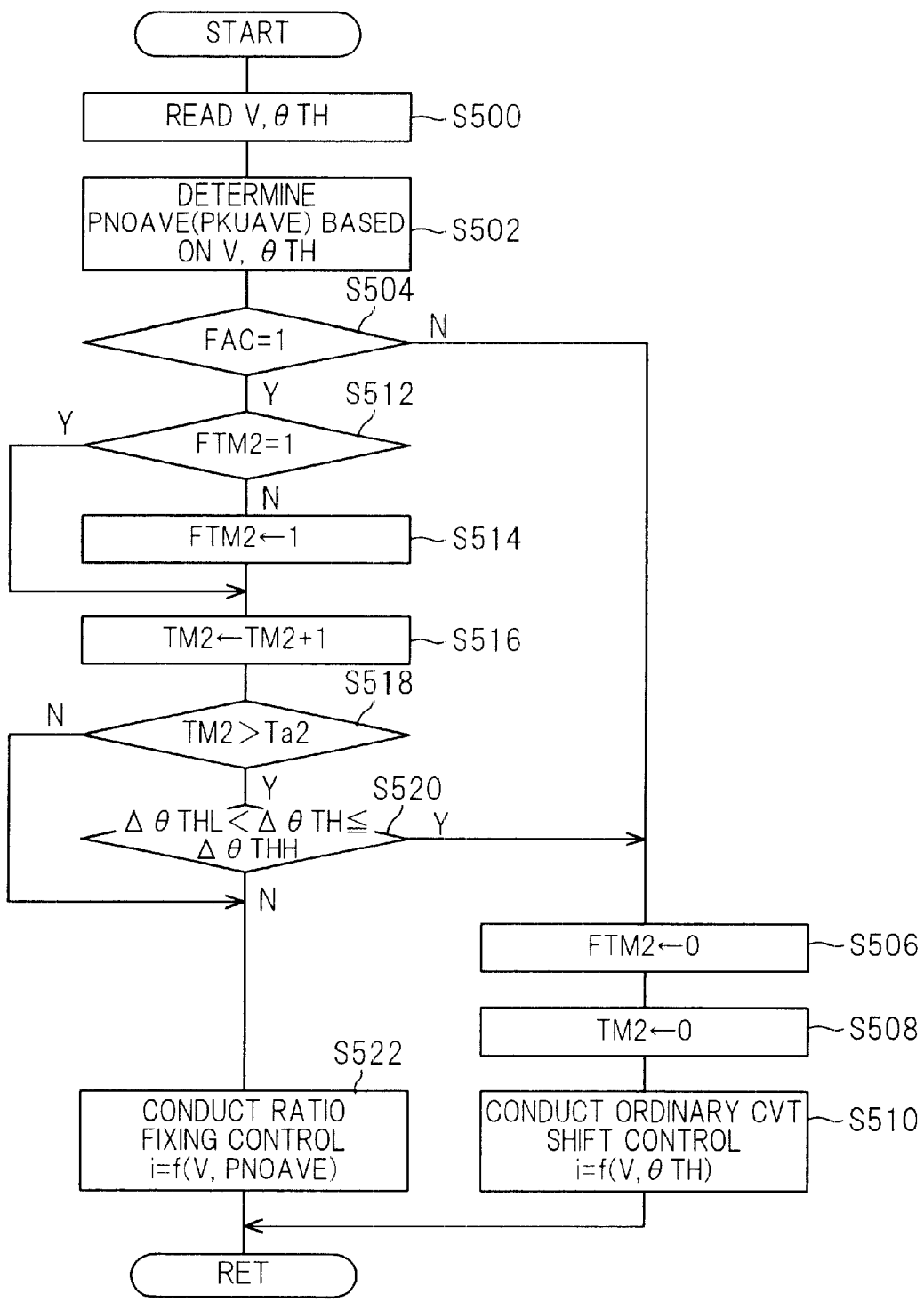
FIG. 12 is a view, similar to FIG. 6, but showing the operation of a vehicle speed control system according to a fifth embodiment of the invention.

FIG. 12 is a flow chart, similar to that of FIG. 6, but showing the operation of a vehicle speed control system according to a fifth embodiment of this invention.

The program begins in S500 in which the detected vehicle speed V and throttle opening θTH are read and proceeds to S502 in which the parameter PNOAVE indicative of upslope or the parameter PKUAVE indicative of downslope is determine based on the detected vehicle speed V and throttle opening θTH in the same manner as mentioned above.

The program proceeds to S504 in which it is determined whether the bit of the flag FAC is set to 1. When the result in S504 is NO, the program proceeds to S506 in which the bit of the flag FTM2 is reset to 0, to S508 in which the timer value TM2 is reset to zero, and to S510 in which, as explained with regard to S18 of the first embodiment, the ordinary CVT shift control is conducted wherein the ratio i is determined or calculated by map-retrieval using the vehicle speed V and throttle opening θTH as address data.

On the other hand, when the result in S504 is YES, the program proceeds to S512 in which it is determined whether the bit of the flag FTM2 is set to 1. When the result is NO, the program proceeds to S514 in which the bit of the flag FTM2 is set to 1, and to S516 in which the timer value TM2 is incremented to start measurement of elapsed time.

The program then proceeds to S518 and it is determined whether the timer value TM2 is greater than a prescribed period of time Ta2. When the result is YES, the program proceeds to S520 in which it is determined whether the throttle opening change ΔθTH is greater than the prescribed value ΔθTHL and is less than a prescribed value Δ θ0 THH.

When the result in S518 or the result in S520 is NO, the program proceeds to S522 in which the ratio restriction processing is similarly conducted. Specifically, the ratio (speed ratio) i is determined or calculated by retrieval from a shift scheduling map (whose characteristics are similar to those shown in FIG. 10) using the detected vehicle speed V and the upslope parameter PNOAVE as address data, and the CVT 24 is controlled to achieve the so-determined ratio i.

When the result in S520 is YES, since this indicates that the throttle opening θTH has stabilized, the program therefore proceeds, through S506 and S508, to S510 in which the CVT shift control is conducted in the ordinary manner based on the vehicle speed V and throttle opening θTH.

In the system according to the fifth embodiment, the ratio i is controlled using the vehicle speed V and the parameter PNOAVE indicative of upslope until the throttle opening θTH has stabilized after the prescribed period of time since the inputting of the instruction to cruise control has elapsed. In other words, since the throttle opening θTH is not used as a CVT shift control parameter, the control is unaffected by fluctuation of the throttle opening θTH.

The system according to the fifth embodiment can therefore avoid occurrence of the inconvenience explained with reference to FIG. 14 and can keep fluctuation in vehicle speed at a relatively small value when the cruise control is effected. The rest of the configuration as well as the effects and advantages thereof is the same as the first embodiment.

Figure 13:
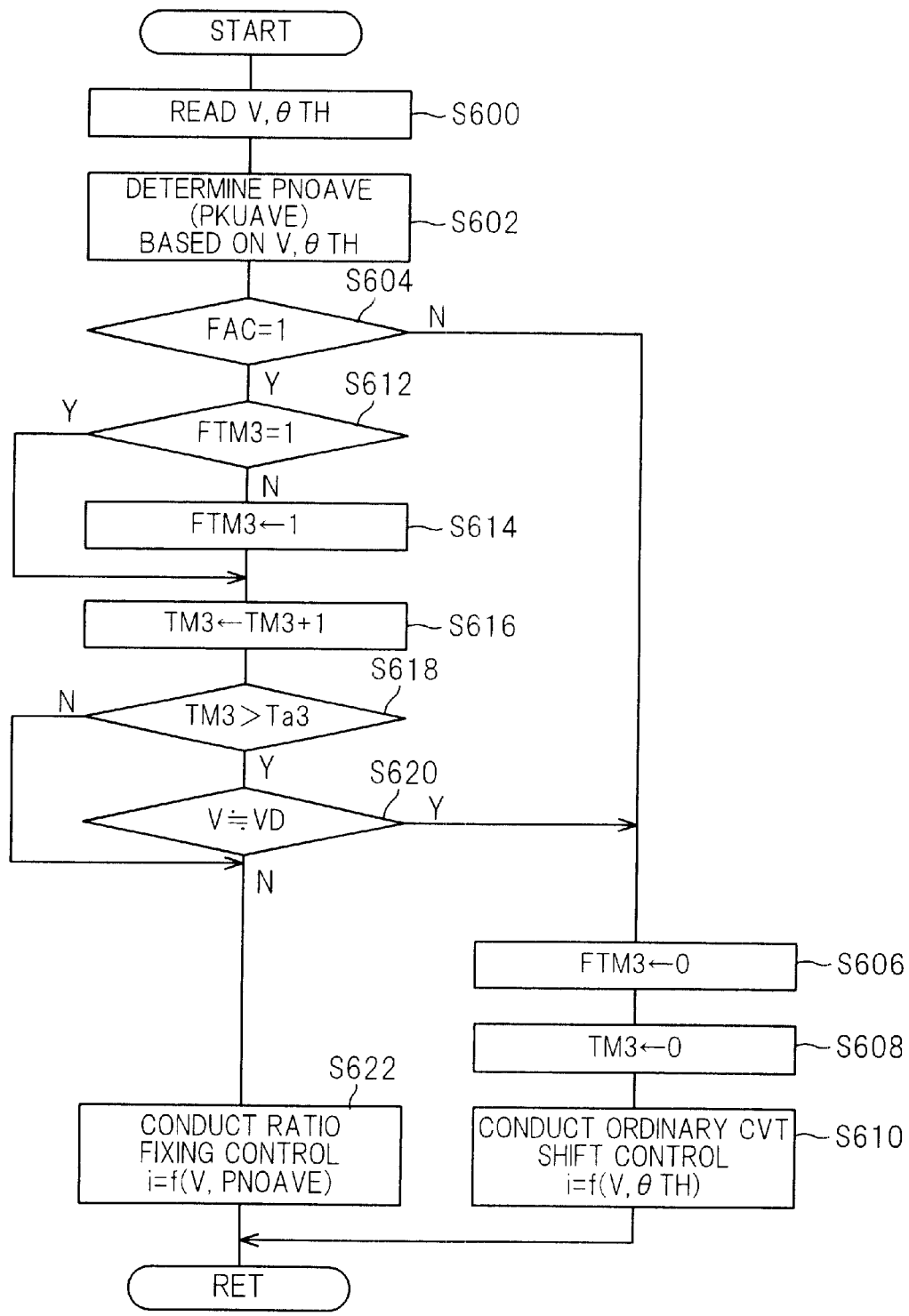
FIG. 13 is a view, similar to FIG. 7, but showing the operation of a vehicle speed control system according to a sixth embodiment of the invention.

FIG. 13 is a flow chart, similar to that of FIG. 7, but showing the operation of a vehicle speed control system according to a sixth embodiment of this invention.

The program begins in S600 in which the detected real vehicle speed V and throttle opening θTH are read and proceeds to S602 in which the parameter PNOAVE or PKUAVE is determined or calculated based on the detected vehicle speed V and throttle opening θTH.

The program proceeds to S604 in which it is determined whether the bit of the flag FAC is set to 1. When the result in S604 is NO, the program proceeds to S606 in which the bit of the flag FTM3 is reset to 0, to S608 in which the timer value TM3 is reset to zero, and to S610 in which, as explained with regard to S18 of the first embodiment, the CVT shift control is ordinarily conducted wherein the ratio i is determined by map-retrieval using the vehicle speed V and throttle opening θTH as address data.

On the other hand, when the result in S604 is YES, the program proceeds to S612 in which it is determined whether the bit of the flag FTM3 is set to 1. When the result is NO, the program proceeds to S614 in which the bit of the flag FTM3 is set to 1, and to S616 in which the timer value TM3 is incremented to start measurement of elapsed time.

The program then proceeds to S618 in which it is determined whether the timer value TM3 is greater than the prescribed period of time Ta3. When the result is YES, the program proceeds to S620 in which it is determined whether the detected vehicle speed V is substantially (or exactly) equal to the set speed (desired speed) VD.

When the result in S618 or the result in S620 is NO, the program proceeds to S622 in which the ratio restriction processing is conducted. Specifically, the ratio (speed ratio) i is determined by retrieval from a shift scheduling map (whose characteristics are similar to those shown in FIG. 10) using the detected vehicle speed V and the upslope parameter PNOAVE as address data, and the CVT 24 is controlled to achieve the so-determined ratio i.

When the result in S620 is YES, since this indicates that the vehicle speed V is converging to the set vehicle speed (desired speed) Vd, the program therefore proceeds, through S606 and S608, to S610 in which the CVT shift control is ordinarily conducted using the vehicle speed V and throttle opening θTH.

In the system according to the sixth embodiment, the ratio i is determined using the vehicle speed V and the parameter PNOAVE indicative of upslope until the vehicle speed V is substantially (or exactly) equal to the desired vehicle speed VD) after the prescribed period of time since the inputting of the instruction to cruise control has elapsed.

In other words, the system according to the sixth embodiment is configured so as not to use the throttle opening θTH as a CVT shift control parameter such that the control is unaffected by any fluctuation that may occur in the throttle opening θTH. It can therefore avoid occurrence of the inconvenience explained with reference to FIG. 14, can reduce throttle opening change and can decreases variation in vehicle speed when the cruise control is effected. The rest of the configuration as well as the effects and advantages thereof is the same as the first embodiment.

It should be noted in the above, although the fourth to sixth embodiments utilize the technique proposed earlier by the assignee of determining the running resistance (specifically a parameter indicative of the upslope of the road on which the vehicle travels) and use the determined value as a CVT shift control parameter, they can instead be equipped with a slope sensor or the like for detecting the slope of the road directly.

It should also be noted that, although the cruise control is disclosed as an example of the vehicle speed control, the followup operation will be added if desired.

It should further be noted that, although a negative-pressure type throttle actuator is used, a motor type or any other Drive-By-Wire type may instead be used.

It should further be noted that, although a metal-belt-type CVT is used, a rubber-belt type or a toroidal-belt type may instead be used.

It should further be noted that, the first to sixth embodiments may be configured not only as a CVT but also so as select an optimum gear of a multi-step transmission. Replacement of the speed ratio with the slip rate of a torque converter lockup clutch may also be possible.

It should further be noted that, the CVT is not limited to the illustrated configuration. A torque converter may be connected to the output shaft of the engine 10 and be used in place of the starter clutch 42. Further, the dual-mass flywheel may be eliminated.

The first to third embodiments are thus configured to have a system for controlling a speed (V) of a vehicle (16) having a continuously variable transmission (CVT 24) which transmits output torque generated by an internal combustion engine (10) mounted on the vehicle to drive wheels of the vehicle, and a cruise controller (120) which controls the speed of the vehicle (V) to a desired speed (VD) in response to an instruction to cruise control inputted by a vehicle operator, comprising: operating condition detecting means (throttle position sensor 96, vehicle speed sensor 106) for detecting operating conditions of the engine and the vehicle including at least an opening (θTH) of a throttle valve (14) and the speed of the vehicle (V); a throttle actuator (70) which is connected to the throttle valve to move the throttle valve; initialization conducting means (S100-S110) for conducting initialization to drive the throttle actuator from an initial position to a position corresponding to the detected opening of the throttle valve at which the instruction to cruise control is inputted; and shift controlling means (S28, S220, S320) for controlling a speed ratio (i) of the continuously variable transmission based at least on the detected opening of the throttle valve and the detected speed of the vehicle; wherein the shift controlling means controlling the speed ratio of the continuously variable transmission to a value (ifix), at which the instruction to cruise control is inputted, for a predetermined period of time (Ta1, Ta2, Ta3) since inputting of the instruction to cruise control (S26-S28, S216-S220, S316-S320).

The system further includes: throttle opening change determining means (S218) for determining whether the detected opening of the throttle valve has stabilized; and the shift controlling means controls the speed ratio to the value until the detected opening of the throttle valve is determined to have stabilized after the predetermined period of time (Ta2) has elapsed (S216-S220). In the system, the throttle opening change determining means includes; comparing means for comparing the detected opening of the throttle valve (ΔθTH) with upper and lower limits (ΔθTHH, L) and for determining whether the detected opening of the throttle valve is within a range defined by the upper and lower limits; and the throttle opening change determining means determines that the detected opening of the throttle valve has stabilized when the detected opening of the throttle valve is determined to be within the range.

The system further includes: comparing means for comparing the detected speed of the vehicle (V) with the desired speed (VD) indicated by the instruction to cruise control and for determining whether the detected speed of the vehicle is substantially equal to the desired speed; and the shift controlling means controls the speed ratio to the value until the detected speed of the vehicle is determined to be substantially equal to the desired speed after the predetermined period of time (Ta3) has elapsed (S316-S320).

The fourth to sixth embodiments are thus configured to have a system for controlling a speed (V) of a vehicle (16) having a continuously variable transmission (CVT 24)

which transmits output torque generated by an internal combustion engine (10) mounted on the vehicle to drive wheels of the vehicle, and a cruise controller (120) which controls the speed of the vehicle (V) to a desired speed (VD) in response to an instruction to cruise control inputted by a vehicle operator, comprising: operating condition detecting means (throttle position sensor 96, vehicle speed sensor 106) for detecting operating conditions of the engine and the vehicle including at least an opening (θTH) of a throttle valve (14) and the speed of the vehicle (V); a throttle actuator (70) which is connected to the throttle valve to move the throttle valve; initialization conducting means (S100-S110) for conducting initialization to drive the throttle actuator from an initial position to a position corresponding to the detected opening of the throttle valve at which the instruction to cruise control is inputted; and first shift controlling means (S410, S510, S610) for controlling a speed ratio (i) of the continuously variable transmission based at least on the detected opening of the throttle valve and the detected speed of the vehicle; running resistance determining means (S402, S502, S602) for determining a running resistance (PNOAVE) acting on the vehicle; second shift controlling means (S420, S522, S622) for controlling the speed ratio of the continuously variable transmission based at least on the determined running resistance and the detected speed of the vehicle; wherein the second shift controlling means controlling the speed ratio of the continuously variable transmission based at least on the determined running resistance and the detected speed of the vehicle for a predetermined period of time (Ta1, Ta2, Ta3) since inputting of the instruction to cruise control (S418-S420, S518-S522, S618-S622).

The system further includes: throttle opening change determining means (S520) for determining whether the detected opening of the throttle valve has stabilized; and the second shift controlling means controls the speed ratio of the continuously variable transmission based at least on the determined running resistance and the detected speed of the vehicle until the detected opening of the throttle valve is determined to have stabilized after the predetermined period of time has elapsed. In the system, the throttle opening change determining means includes; comparing means (S520) for comparing the detected opening of the throttle valve (ΔθTH) with upper and lower limits (ΔθTHH, L) and for determining whether the detected opening of the throttle valve is within a range defined by the upper and lower limits; and the throttle opening change determining means determines that the detected opening of the throttle value has stabilized when the detected opening of the throttle valve is determined to be within the range.

The system further includes: comparing means (S620) for comparing the detected speed of the vehicle (V) with the desired speed (VD) indicated by the instruction to cruise control and for determining whether the detected speed of the vehicle is substantially equal to the desired speed and the second shift controlling means controls the speed ratio of the continuously variable transmission based at least on the determined running resistance and the detected speed of the vehicle until the detected speed of the vehicle is determined to be substantially equal to the desired speed after the predetermined period of time has elapsed.

In the system, the running resistance is determined to be a parameter (PNOAVE) indicative of upslope of a road where the vehicle climbs.

While the invention has thus been shown and described with reference to specific embodiments, it should be noted that the invention is in no way limited to the details of the described arrangements but changes and modifications may be made without departing from the scope of the appended claims.

What is claimed is:

1. A system for controlling a speed of a vehicle having a continuously variable transmission which transmits output torque generated by an internal combustion engine mounted on the vehicle to drive wheels of the vehicle, and a cruise controller which controls the speed of the vehicle to a desired speed in response to an instruction to cruise control inputted by a vehicle operator, comprising:

operating condition detecting means for detecting operating conditions of the engine and the vehicle including at least an opening of a throttle valve and the speed of the vehicle;

a throttle actuator which is connected to the throttle valve to move the throttle valve;

first shift controlling means for controlling a speed ratio of the continuously variable transmission based at least on the detected opening of the throttle valve and the detected speed of the vehicle;

running resistance determining means for determining a running resistance acting on the vehicle; and second shift controlling means for controlling the speed ratio of the continuously variable transmission based at least on the determined running resistance and the detected speed of the vehicle;

wherein
the second shift controlling means controls the speed ratio of the continuously variable transmission based at least on the determined running resistance and the detected speed of the vehicle until a predetermined condition is met from the instruction inputted to the cruise control.

2. The system according to claim 1, further including:

throttle opening change determining means for determining throttle opening change;

wherein the second shift controlling means controls the speed ratio of the continuously variable transmission based at least on the determined running resistance and the detected speed of the vehicle until the detected opening of the throttle valve is determined to have stabilized based on the determined throttle opening change such that the predetermined condition is met.

3. The system according to claim 1, wherein the second shift controlling means determines whether the predetermined condition is met based on the detected speed of the vehicle.

4. The system according to claim 1, wherein the running resistance is determined to be a parameter indicative of upslope of a road where the vehicle climbs.

5. The system according to claim 2, wherein the throttle opening change determining means includes:

comparing means for comparing the detected opening of the throttle valve with upper and lower limits and for determining whether the detected opening of the throttle valve is within a range defined by the upper and lower limits;

wherein the throttle opening change determining means determines that the detected opening of the throttle valve has stabilized when the detected opening of the throttle valve is determined to be within the range.

6. The system according to claim 3, further including:

comparing means for comparing the detected speed of the vehicle with the desired speed indicated by the instruction to cruise control and for determining whether the detected speed of the vehicle is substantially equal to the desired speed;

and the second shift controlling mean controls the speed ratio of the continuously variable transmission based at least on the determined running resistance and the detected speed of the vehicle until the detected speed of the vehicle is determined to be substantially equal to the desired speed such that the predetermined condition is met.

7. A method of controlling a speed of a vehicle having a continuously variable transmission which transmits output torque generated by an internal combustion engine mounted on the vehicle to drive wheels of the vehicle, and a cruise controller which controls the speed of the vehicle to a desired speed in response to an instruction to a cruise control inputted by a vehicle operator using a throttle actuator which is connected to a throttle valve to move the throttle valve, comprising the steps of:

detecting operating conditions of the engine and the vehicle including at least an opening of the throttle valve and the speed of the vehicle;

controlling a first speed ratio of the continuously variable transmission based at least on the detected opening of the throttle valve and the detected speed of the vehicle;

determining a running resistance acting on the vehicle; and controlling the second speed ratio of the continuously variable transmission based at least on the determined running resistance and the detected speed of the vehicle until a predetermined condition is met from the instruction inputted to the cruise control.

8. The method according to claim 7, further including the steps of:

determining a change in the opening of the throttle valve; and controlling the second speed ratio of the continuously variable transmission based at least on the determined running resistance and the detected speed of the vehicle until the detected opening of the throttle valve is determined to have stabilized based on the determined change in the opening of the throttle valve such that the predetermined condition is met.

9. The method according to claim 7, wherein the step of controlling the second speed ratio further comprises the step of determining whether the predetermined condition is met based on the detected speed of the vehicle.

10. The method according to claim 7, wherein the step of determining the running resistance further comprises the step of:

determining the running resistance to be a parameter indicative of upslope of a road where the vehicle climbs.

11. The method according to claim 8, wherein the step of determining a change in the opening of the throttle valve further includes the step of:

comparing the detected opening of the throttle valve with upper and lower limits and determining whether the detected opening of the throttle valve is within a range defined by the upper and lower limits; and determining that the detected opening of the throttle value has stabilized when the detected opening of the throttle valve is within the range.

12. The method according to claim 9, further including the steps of:

comparing the detected speed of the vehicle with the desired speed indicated by the instruction to the cruise control;

determining whether the detected speed of the vehicle is substantially equal to the desired speed; and controlling the second speed ratio of the continuously variable transmission based at least on the determined running resistance and the detected speed of the vehicle until the detected speed of the vehicle is determined to be substantially equal to the desired speed such that the predetermined condition is met.

* * * * *